United States Patent
Variankaval et al.

(10) Patent No.: US 8,412,607 B2
(45) Date of Patent: *Apr. 2, 2013

(54) PRICE EARNINGS DERIVATIVE FINANCIAL PRODUCT

(75) Inventors: Rama Variankaval, Weehawken, NJ (US); Cassio Calil, New York, NY (US); Santosh Nabar, Englewood, NJ (US); Joseph Ghartey, New York, NY (US)

(73) Assignee: JPMorgan Chase Bank, National Association, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,290

(22) Filed: Aug. 14, 2012

(65) Prior Publication Data
US 2012/0310859 A1 Dec. 6, 2012

Related U.S. Application Data

(63) Continuation of application No. 11/346,181, filed on Feb. 3, 2006, now Pat. No. 8,280,794.

(51) Int. Cl.
*G06Q 40/00* (2012.01)

(52) U.S. Cl. ............... 705/35; 705/14; 705/30; 705/36; 705/36 R; 705/36 T; 705/37; 705/52; 707/4; 435/7.1

(58) Field of Classification Search ............ 705/14, 705/30, 35, 36, 36 R, 36 T, 37, 52; 707/4; 435/7.1

See application file for complete search history.

(56) References Cited

U.S. PATENT DOCUMENTS

| | | | |
|---|---|---|---|
| 4,169,285 A | 9/1979 | Walker | |
| 4,334,270 A | 6/1982 | Towers | |
| 4,566,066 A | 1/1986 | Towers | |
| 4,648,038 A | 3/1987 | Roberts et al. | |
| 4,739,478 A | 4/1988 | Roberts et al. | |
| 4,742,457 A | 5/1988 | Leon et al. | |
| 4,752,877 A | 6/1988 | Roberts et al. | |
| 4,933,842 A | 6/1990 | Durbinet et al. | |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A * | 12/1993 | Higgins | 705/37 |
| 5,297,032 A | 3/1994 | Trojan et al. | |

(Continued)

FOREIGN PATENT DOCUMENTS

| | | |
|---|---|---|
| WO | WO 98/43170 | 10/1998 |
| WO | WO 01/20530 | 3/2001 |

(Continued)

OTHER PUBLICATIONS

Mango et al., A Framework for Adaptive Mail Classification, 14th IEEE Conference on Tools with Artificial Intelligence (ICTAI'02), Nov. 4, 2002, p. 387.

(Continued)

*Primary Examiner* — James Trammell
*Assistant Examiner* — Sanjeev Malhotra
(74) *Attorney, Agent, or Firm* — Hunton & Williams LLP

(57) ABSTRACT

A system for and method of using a financial instrument to take a view on a price-to-earnings ratio for a set of one or more equities. The system and method may be used to commodify the price-to-earnings ratio for one or more equities, such a as a stock or an index. The system and method may include a financial instrument that allows a user to take a view on an earnings, or ratio comprising price and earnings, for underlying equities.

10 Claims, 3 Drawing Sheets

U.S. PATENT DOCUMENTS

| | | |
|---|---|---|
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,783,808 A | 7/1998 | Josephson |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 5,996,700 A | 12/1999 | Sulmone |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,109 A | 6/2000 | Flores et al. |
| 6,073,115 A | 6/2000 | Marshall |
| 6,078,903 A | 6/2000 | Kealhofer |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 * | 7/2003 | Wallman ................... 705/36 R |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 6,711,554 B1 | 3/2004 | Salzmann et al. |
| 6,832,209 B1 * | 12/2004 | Karp et al. .................... 705/36 T |
| 7,110,998 B1 * | 9/2006 | Bhandari et al. .................. 707/4 |
| 7,191,392 B1 | 3/2007 | Coar |
| 7,222,094 B2 | 5/2007 | Ross |
| 7,392,210 B1 | 6/2008 | MacKay et al. |
| 7,392,212 B2 | 6/2008 | Hancock et al. |
| 7,716,107 B1 | 5/2010 | Variankaval et al. |
| 7,827,096 B1 | 11/2010 | Rothschild |
| 2001/0011241 A1 | 8/2001 | Nemzow |
| 2001/0011242 A1 | 8/2001 | Allex et al. |
| 2001/0016819 A1 | 8/2001 | Kolls |
| 2001/0018674 A1 | 8/2001 | Schein et al. |
| 2001/0020236 A1 | 9/2001 | Cannon |
| 2001/0025264 A1 | 9/2001 | Deaddio et al. |
| 2001/0032207 A1 | 10/2001 | Hartley |
| 2001/0032217 A1 | 10/2001 | Huang |
| 2001/0034686 A1 | 10/2001 | Eder |
| 2001/0041344 A1 * | 11/2001 | Sepetov et al. ................. 435/7.1 |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |

| | | |
|---|---|---|
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0010670 A1* | 1/2002 | Mosler et al. .................... 705/37 |
| 2002/0013753 A1 | 1/2002 | Marks de Chabris et al. |
| 2002/0013758 A1 | 1/2002 | Khaitan |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukranincsky et al. |
| 2002/0023053 A1 | 2/2002 | Szoc et al. |
| 2002/0026402 A1 | 2/2002 | Okamura |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032638 A1 | 3/2002 | Arora |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049665 A1 | 4/2002 | Solomon et al. |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0077178 A1 | 6/2002 | Oberger |
| 2002/0077893 A1 | 6/2002 | Wolf |
| 2002/0078253 A1 | 6/2002 | Szondy et al. |
| 2002/0087373 A1 | 7/2002 | Dickstein et al. |
| 2002/0087454 A1 | 7/2002 | Calo |
| 2002/0087455 A1 | 7/2002 | Tsagarakis et al. |
| 2002/0087457 A1 | 7/2002 | Madeley et al. |
| 2002/0091609 A1 | 7/2002 | Markowski |
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2003/0004942 A1 | 1/2003 | Bird |
| 2003/0009411 A1 | 1/2003 | Ram et al. |
| 2003/0014343 A1* | 1/2003 | Jones .................... 705/36 |
| 2003/0018558 A1 | 1/2003 | Heffner et al. |
| 2003/0018572 A1 | 1/2003 | Beschle |
| 2003/0018714 A1 | 1/2003 | Mikhailov et al. |
| 2003/0033205 A1 | 2/2003 | Nowers |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0083908 A1 | 5/2003 | Steinmann |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0135410 A1 | 7/2003 | Chapman |
| 2003/0140035 A1 | 7/2003 | Burrows |
| 2003/0149653 A1 | 8/2003 | Penney |
| 2003/0149662 A1 | 8/2003 | Shore |
| 2003/0154071 A1 | 8/2003 | Shreve |
| 2003/0158949 A1 | 8/2003 | Miller et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0002906 A1 | 1/2004 | Von Drehnen |
| 2004/0039666 A1 | 2/2004 | Fudali et al. |
| 2004/0064397 A1 | 4/2004 | Lynn et al. |
| 2004/0078248 A1 | 4/2004 | Altschuler |
| 2004/0103003 A1 | 5/2004 | Mayers et al. |
| 2004/0122736 A1* | 6/2004 | Strock et al. .................... 705/14 |
| 2004/0148247 A1 | 7/2004 | Miller et al. |
| 2004/0162775 A1 | 8/2004 | Winklevoss et al. |
| 2004/0167850 A1 | 8/2004 | Dreyer et al. |
| 2004/0215553 A1 | 10/2004 | Gang et al. |
| 2004/0220885 A1 | 11/2004 | Sazmann et al. |
| 2004/0225596 A1 | 11/2004 | Kemper et al. |
| 2004/0236648 A1 | 11/2004 | Yip |
| 2004/0260643 A1 | 12/2004 | Glicksman |
| 2005/0060254 A1* | 3/2005 | Jones .................... 705/36 |
| 2005/0060256 A1 | 3/2005 | Peterson et al. |
| 2005/0075959 A1* | 4/2005 | Woodruff et al. .................... 705/35 |
| 2005/0075961 A1 | 4/2005 | McGill |
| 2005/0080704 A1 | 4/2005 | Erlach |
| 2005/0086148 A1 | 4/2005 | Woodruff et al. |
| 2005/0086170 A1 | 4/2005 | Rao |
| 2005/0102213 A1 | 5/2005 | Savasoglu et al. |
| 2005/0102214 A1 | 5/2005 | Speth et al. |
| 2005/0119962 A1 | 6/2005 | Bowen |
| 2005/0125318 A1* | 6/2005 | Jameson .................... 705/30 |
| 2005/0131789 A1 | 6/2005 | Mintz |
| 2005/0164762 A1 | 7/2005 | Smith |
| 2005/0198008 A1 | 9/2005 | Adler |
| 2005/0209949 A1* | 9/2005 | Le Guyader .................... 705/36 |
| 2005/0251475 A1 | 11/2005 | Sato |
| 2006/0036647 A1 | 2/2006 | Fichtner |
| 2006/0111956 A1 | 5/2006 | Whitesage |
| 2006/0282355 A1 | 12/2006 | Canezin |
| 2006/0287953 A1 | 12/2006 | Chauhan |
| 2007/0043654 A1 | 2/2007 | Libman |
| 2007/0043770 A1 | 2/2007 | Goodrich |
| 2007/0078771 A1* | 4/2007 | Allin et al. .................... 705/52 |
| 2007/0156555 A1* | 7/2007 | Orr .................... 705/35 |
| 2008/0040777 A1 | 2/2008 | Aihara |

FOREIGN PATENT DOCUMENTS

| | | |
|---|---|---|
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email Report, Issue 11, Aug. 16, 2001, printed Aug. 2, 2005.
Fast Email Extractor 4.4.
Form 10-K, United States Securities and Exchange Commission, no date,year ending Dec. 31, 2003.
PILA, In Case of Emergency; contingent capital.
Intellseek and Inxight Partner to Provide New Business Intelligence Solutions, www.inxight.com/news/021029_intelliseek.html, Oct. 29, 2002.
Unknown, Investigating Systems.
MAY, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data—The WebQA Approach.
Rising to the challenge of global STP, Euromoney Publications PLC Global Inventor, Nov. 1, 1999, pp. 51-52; Issn. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structuring the Web.
Witten et al., Text Mining: A New Frontier for Lossless Compression.
Fan et al., The Internet and Future Financial Markets; Industry Trend or Event, Association for Computing Machinery, Inc., Sec. 11, vol. 43; Nov. 1, 2000, p. 82; Issn: 0001-0782.
Emery, et al., The Measurement of Liquidity, Journal of Accounting Research, vol. 20, No. 2, Part 1, p. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; Issn: 0014-2433.
Elkayam, Using Indexed Bonds.
Myllymaki, With Standard XML Technologies.
Hewlett-Packard, x4queview.org.
Freddie Mac's Document Custody Procedure Overview Dec. 2003.

* cited by examiner

PRICE EARNINGS DERIVATIVE FINANCIAL PRODUCT

CROSS-REFERENCE TO RELATED APPLICATIONS

The present application is a continuation of, and claims priority to, U.S. patent application Ser. No. 11/346,181 entitled "Price Earnings Derivative Financial Product" to Variankaval et al., which is incorporated by reference herein in its entirety.

FIELD OF THE INVENTION

The present invention generally relates to derivative financial products based on price-to-earnings ratios or earnings per equity. More particularly, the invention relates to a financial instrument that allows a user to take a view on an earnings, or ratio comprising price and earnings, for underlying equities.

SUMMARY OF THE CLAIMED INVENTION

According to an embodiment of the present invention, a method of using a ratio comprising price and earnings to value a derivative based on at least one equity as part of a transaction is disclosed. The method includes selecting a fixed strike price to earnings ratio value, a cash notional value for the transaction, a set comprising at least one equity, and a maturity date. The method also includes calculating, on or after the maturity date, a price to earnings ratio for the set comprising at least one equity. The method further includes calculating a difference between the fixed strike price to earnings ratio and the price to earnings ratio for the set comprising at least one equity. The method further includes settling a payoff, where the payoff comprises a product of the cash notional value and the difference.

According to another embodiment of the present invention, a method of using a ratio comprising price and earnings to value a financial product based upon at least one equity as part of a transaction is disclosed. The method includes selecting a ratio function comprising price and earnings, the ratio function being associated with a set comprising at least one equity. The method also includes selecting a quantity, the quantity being associated with the set comprising at least one equity. The method further includes calculating a payoff using the ratio function and the quantity, where the calculating occurs after the selecting. The method further includes conducting a transaction, subsequent to the calculating, where the payoff comprises at least part of the transaction.

Various optional features of the above embodiment include the following. The ratio function may include an empirically measured price to earnings ratio value of a set comprising at least one equity, where the empirically measured price to earnings ratio value is empirically measured subsequent to the selecting. The ratio function may be a constant function, the constant function representing a strike price to earnings ratio. The ratio function may include at least one of a floor and a ceiling. The method may include repeating the calculating and conducting at a subsequent point in time. The transaction may be part of a swap. The quantity may include a cash notional value for the transaction. The quantity may include a notional number of equities. The quantity may further include a present earnings or a future earnings. The set comprising at least one equity may be: an index, a basket of stocks, or a stock. The financial product may include: a bond, a put option, a call option, an American option, a European option, or a swaption.

According to another embodiment of the present invention, a method of using a ratio comprising price and earnings to value a financial product based upon at least one equity as part of a transaction is disclosed. The method includes selecting an algorithm for calculating a ratio comprising price and earnings on at least one future date, the ratio being associated with a set comprising at least one equity. The method also includes selecting a quantity, the quantity being associated with the set comprising at least one equity. The method further includes calculating a payoff using a ratio produced by the algorithm and the quantity, where the calculating occurs after the selecting. The method further includes conducting a transaction, subsequent to the calculating, where the payoff comprises at least part of the transaction.

Various optional features of the above embodiment include the following. The algorithm may include empirically measuring a price to earnings ratio value of a set comprising at least one equity, where the measuring occurs subsequent to the selecting. The algorithm may produce a single, predetermined value, the value comprising a strike price to earnings ratio. The algorithm may include at least one of a floor and a ceiling. The method may include repeating the calculating and conducting at a subsequent point in time. The transaction may be part of a swap. The quantity may include a cash notional value for the transaction. The quantity may include a notional number of equities. The quantity may further include a present earnings or a future earnings. The set comprising at least one equity may be: an index, a basket of stocks, or a stock. The financial product ma include: a bond, a put option, a call option an American option, a European option, or a swaption.

According to another embodiment of the present invention, a system for using a ratio comprising price and earnings to value a financial product based upon at least one equity as part of a transaction is disclosed. The system includes a contract specifying a ratio function comprising price and earnings for future use, the ratio function being associated with a set comprising at least one equity, the contract further specifying a quantity associated with the set comprising at least one equity. The system also includes a computer configured to calculate a payoff using the ratio function and the quantity in accordance with the contract. The system further includes a transaction including at least part of the payoff.

Various optional features of the above embodiment include the following. The ratio function may include an empirically measured price to earnings ratio value of a set comprising at least one equity, where the empirically measured price to earnings ratio value is empirically measured subsequent to the selecting. The ratio function may be a constant function, the constant function representing a strike price to earnings ratio. The ratio function may include at least one of a floor and a ceiling. The computer may be configured to repeatedly calculate a value of at least one quantity using the ratio function in accordance with the contract, and the system may further include a second transaction comprising at least part of the value. The system may include a swap, where the transaction is part of the swap. The at least one quantity may include a cash notional value for the transaction. The quantity may include a notional number of equities. The set comprising at least one equity may be: an index, a basket of stocks, or a stock. The financial product may include: a bond, a put option, a call option, an American option, a European option, or a swaption.

According to another embodiment of the present invention, a method of using earnings to value a financial product based upon at least one equity as part of a transaction is disclosed. The method includes selecting an earnings function, the earnings function being associated with a set comprising at least one equity. The method also includes selecting a quantity, the quantity being associated with the set comprising at least one equity. The method further includes calculating a payoff using the earnings function and the quantity, where the calculating occurs after the selecting. The method further includes conducting a transaction, subsequent to the calculating, where the payoff comprises at least part of the transaction.

Various optional features of the above embodiment include the following. The earnings function may include an empirically measured earnings value of a set comprising at least one equity, where the empirically measured earnings value is empirically measured subsequent to the selecting. The earnings function may be a constant function, the constant function representing a strike earnings. The earnings function may include at least one of a floor and a ceiling. The method may further include repeating the calculating and conducting at a subsequent point in time. The transaction may be part of a swap. The quantity may include a notional number of equities. The set comprising at least one equity may be: an index, a basket of stocks, or a stock. The financial product may include: a bond, a put option, a call option, an American option, a European option, or a swaption.

According to another embodiment of the present invention, a method of using an earnings to value a financial product based upon at least one equity as part of a transaction is disclosed. The method includes selecting an algorithm for calculating an earnings on at least one future date, the earnings being associated with a set comprising at least one equity. The method also includes selecting a quantity, the quantity being associated with the set comprising at least one equity. The method further includes calculating a payoff using a ratio produced by the algorithm and the quantity, where the calculating occurs after the selecting. The method further includes conducting a transaction, subsequent to the calculating, where the payoff comprises at least part of the transaction.

Various optional features of the above embodiment include the following. The algorithm may include empirically measuring an earnings value of a set comprising at least one equity, where the measuring occurs subsequent to the selecting. The algorithm may produce a single, predetermined value, the value comprising a strike earnings. The algorithm may include at least one of a floor and a ceiling. The method may further include repeating the calculating and conducting at a subsequent point in time. The transaction may be part of a swap. The quantity may include a notional number of equities. The set comprising at least one equity may be: an index, a basket of stocks, or a stock. The financial product may include: a bond, a put option, a call option, an American option, a European option, or a swaption.

According to another embodiment of the present invention, a system for using an earnings to value a financial product based upon at least one equity as part of a transaction is presented. The system includes a contract specifying an earnings function for future use, the earnings function being associated with a set comprising at least one equity, the contract further specifying a quantity associated with the set comprising at least one equity. The system also includes a computer configured to calculate a payoff using the earnings function and the quantity in accordance with the contract. The system further includes a transaction comprising at least part of the payoff.

Various optional features of the above embodiment include the following. The earnings function may include an empirically measured earnings value of a set comprising at least one equity, where the empirically measured earnings value is empirically measured subsequent to the selecting. The earnings function may be a constant function, the constant function representing a strike earnings value. The earnings function may include at least one of a floor and a ceiling. The computer may be configured to repeatedly calculate a value of at least one quantity using the earnings function in accordance with the contract, further comprising a second transaction comprising at least part of the value. The system may include a swap, where the transaction is part of the swap. The quantity may include a notional number of equities. The set comprising at least one equity may be: an index, a basket of stocks, or a stock. The financial product may include: a bond, a put option, a call option, an American option, a European option, or a swaption.

According, to another embodiment of the present invention, a system of using a price to earnings ratio to value a financial product based upon at least one equity as part of a transaction is presented. The system includes means for recording a selected ratio function comprising price and earnings, the ratio function being associated with a set comprising at least one equity and for recording a quantity, the quantity being associated with the set comprising at least one equity. The system also includes means for calculating a payoff using the ratio function and the quantity. The system further includes means for conducting a transaction, subsequent to the calculating, where the value comprises at least part of the transaction.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

According to an embodiment of the present invention, a financial derivative based on the price-to-earnings ratio ("P/E") for one or more equities (e.g., stocks) is disclosed. Certain embodiments of the present invention may be used to commodify a price-to-earnings ratio for various purposes.

Figure 1:
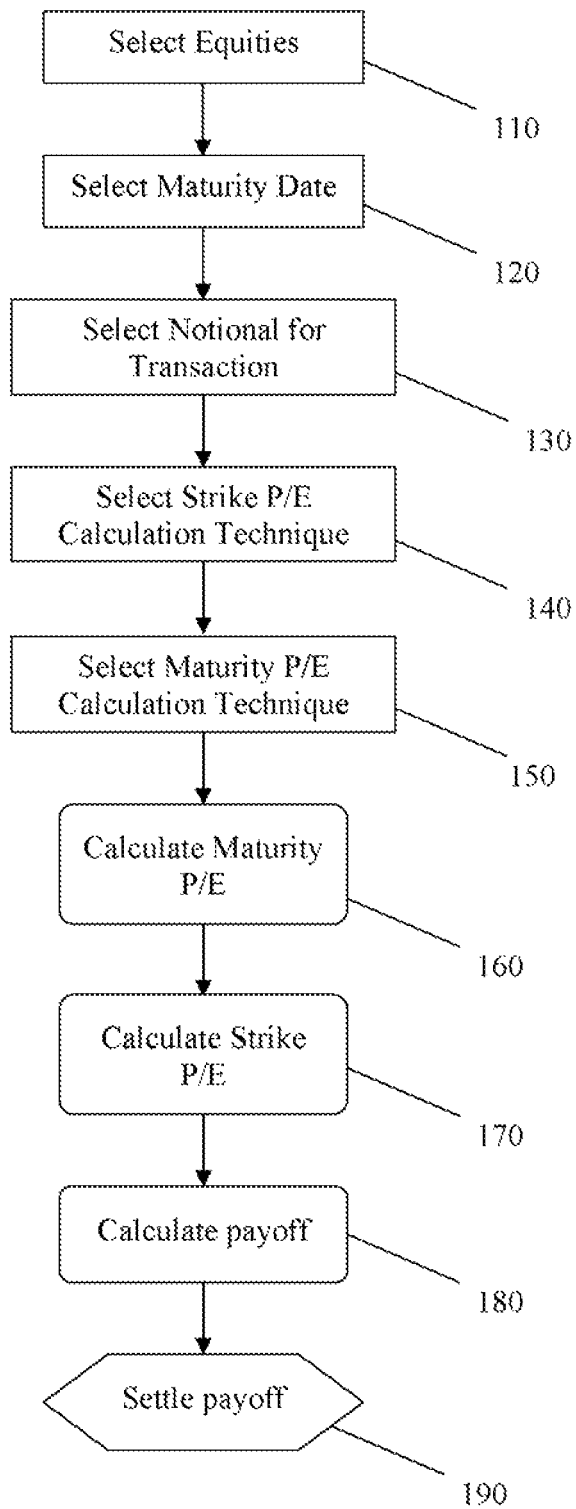
FIG. 1 is a flowchart depicting a price-to-earnings ratio forward financial product according to an embodiment of the present invention.

FIG. 1 is a flowchart depicting a price-to-earnings ratio forward financial product according to an embodiment of the present invention. Two parties are involved with this exemplary embodiment. Such parties may include, by way of non-limiting example, a hedge fund ("fund") and an investment bank ("bank"). In this embodiment, the bank and fund arrange for a future trade based on a cash notional value and a strike price-to-earnings ratio for a set of underlying equities. No up-front fees are required to be exchanged between the parties (although variations are possible, e.g., in which one party pays a fee in exchange for more control over the strike P/E).

At step 110, the bank and fund agree upon a set of one or more equities. The equities may be, by way of non-limiting example, a single equity instrument (e.g., a stock) an index (e.g., the S&P 500), or a basket of equity instruments (e.g., a mutual fund or custom basket of stocks).

At step 120, the bank and fund agree upon a contract maturity date. As discussed below in reference to step 180, the bank and fund settle any payoff that results from the implementation of the embodiment under discussion on or after the contract maturity date.

At step 130, the bank and fund select a notional for the transaction. The notional may be a cash notional. The cash notional does not necessarily represent a fixed number of equities in this embodiment. Alternately, the notional may comprise a notional number of equities. The notional may further comprise a price per unit of equity as predicted or measured at any given time, such as at inception or at maturity.

At step 140, the bank and fund negotiate a strike P/E calculation technique. The strike P/E may be a fixed number that is negotiated between the parties. Alternately, the strike P/E may be a function, i.e., the parties may select a strike P/E calculation technique. The function may be a constant function, i.e., a function whose value is always a fixed number. In that case, the strike ratio function may be essentially the same as a fixed strike P/E. Alternately, the strike P/E calculation may be a function of one or more empirically measured price and/or earnings that are calculated on or near the maturity date. In one embodiment, the strike P/E ratio function outputs the maturity P/E for a set of equities other than the set of equities selected at step 110 and associated with the notional number of equities. In another embodiment, the strike P/E ratio function outputs the maturity P/E for the equities selected at step 110 and associated with the notional number of equities, with restrictions imposed by ceiling and/or floor boundaries (discussed further below in the context of maturity calculation). In general, the strike P/E allows the parties to indicate their predictions of the P/E for the set of equities at the maturity date.

At step 150, the parties agree on a calculation technique for deriving a maturity P/E. Most corporations report their earnings quarterly. Preferably, there will be at least one earnings report prior to the maturity date, although estimated earnings may suffice in some circumstances. In general, the maturity P/E may be calculated by dividing the price per one unit of the equities by the associated reported earnings per unit. More particularly, the maturity P/E may be calculated, by way of non-limiting example, using the price at maturity and the last announced earnings (e.g., annualized earnings). The maturity earnings may be calculated as the trailing twelve month earnings per share ("EPS") before extraordinary items. Alternately, the maturity earnings may be calculated as the trailing twelve month diluted EPS from continuous operations. These and other techniques may be used for sets of multiple equities. For such sets, and by way of non-limiting example, the earnings may be calculated as the sum $\Sigma E$ of each individual earning, the price may be calculated as the sum $\Sigma P$ of each individual price, and the maturity P/E may be calculated as $\Sigma P/\Sigma E$.

The parties may agree that maturity P/E function be limited in some way. For example, the parties may agree that the maturity P/E calculation technique implement a ceiling or a floor. Thus, the maturity P/E calculation technique may involve calculating the P/E of an underlying set of one or more equities on the maturity date, and implementing a ceiling or floor if the P/E falls outside of a range. Maturity P/E calculation techniques that include ceilings and/or floors may be expressed as P/E ratio functions. A maturity P/E function employing a ceiling and a floor may be represented as, by way of non-limiting example:

$$\text{Maturity } P/E = \begin{cases} \text{ceiling,} & \text{if measured } P/E > \text{ceiling,} \\ \text{measured } P/E, & \text{if floor} \leq \text{measured } P/E \leq \text{ceiling, or} \\ \text{floor,} & \text{if measured } P/E < \text{floor.} \end{cases}$$

Bloomberg L.P. may be used to provide quantities used to calculate the maturity P/E, as well as other quantities associated with embodiments of the present invention. By way of non-limiting example, Bloomberg, L.P. may provide such information by way of computer screens delivered to the bank, fund, or to a third party.

At step 160, the maturity P/E is calculated, typically on the maturity date. The maturity P/E is calculated according to the calculation technique (e.g., P/E function) agreed upon at step 150. At step 170 the strike P/E is calculated according to the calculation technique selected at step 140. Note that the strike P/E and maturity P/E may be calculated in any order; that is, step 160 need not occur prior to step 170.

At step 180, any payoff resulting from the embodiment of the present invention is calculated. The payoff arises as the difference between the maturity P/E and the strike P/E. Accordingly, the payoff may be calculated as the product of the notional and the difference between the maturity P/E and the strike P/E. Thus, for this embodiment, the payoff for the party taking the long position in the P/E may be calculated as:

Payoff=(Cash Notional)×[(Maturity P/E)−(Strike P/E)]

The payoff for the party taking the short position may be determined as the negative of the above formula. That is, the payoff for the party taking the short position may be represented as: Payoff=(Cash Notional)×[(Strike P/E)−(Maturity P/E)]. Note that a negative payoff indicates that the relevant party must pay out.

At step 190, the parties settle the payoff by conveying cash or other valuable consideration. The direction of the conveyance depends in part on which party takes the long position in this embodiment and which party takes the short position.

A particular implementation of the embodiment of FIG. 1 may be used by an investor who believes that the current P/E of a particular stock or index cannot be sustained. The investor may enter into the short position of a financial product according to the embodiment of FIG. 1 and receive a payoff if the P/E drops. Consider for example an investor who believes that the P/E of a given technology stock is inflated. The investor enters into the short position of a contract with a bank according to an embodiment of the present invention.

Continuing this example, suppose the current P/E of the technology stock is 20. Tracking the steps according to FIG. 1, the parties agree at step 110 that the technology stock represents the underlying equity for the transaction. At step 120, the parties agree that the maturity date will be in six months. At step 130, the parties agree upon a $100,000 cash notional value for the transaction. At step 140, the parties agree that the strike P/E will be 20, which also happens to be the current P/E. At step 150, the parties agree to a maturity P/E calculation technique, namely, using the trailing twelve month diluted EPS from continuous operations and the price at maturity, as depicted on the appropriate screen provided by Bloomberg, L.P.

On the maturity date, the parties calculate the maturity P/E at step 160 according to the maturity P/E function selected at step 150. The results of those calculations reveals the maturity P/E to be 15. The strike P/E is calculated as being the fixed value of 20 at step 170. To summarize this example:
(Cash Notional)=$100,000;
(Strike P/E)=20; and
(Maturity P/E)=15.
At step 180, the investor calculate its payoff according to:

$$\text{Payoff} = (\text{Cash Notional}) \times [(\text{Strike } P/E) - (\text{Maturity } P/E)]$$
$$= \$100,000 \times [20 - 15]$$
$$= \$500,000.$$

That the above quantity is positive reflects that the bank owes the investor, who took the short position on the P/E of the technology stock, $500,000. To conclude the transaction, at step 180, the bank pays the investor $500,000.

The embodiment of FIG. 1 may be altered to employ earnings-to-price ratios instead of price-to-earnings ratios. For example, any strike P/E ratio function may be replaced with its reciprocal, yielding a strike E/P function. Likewise, any maturity P/E ratio function may be replaced by its reciprocal, yielding a maturity E/P ratio function. As in such an altered embodiment, the parties may agree on a notional, which may be a cash motional, at the start of the method. The payout for embodiments that employ earnings-to-price ratios may be calculated according to, by way of non-limiting example:

Payoff=(Cash Notional)×[(Maturity $E/P$)−(Strike $E/P$)].

Note that the basic embodiment of FIG. 1 may be used to create investments based upon a P/E, a notional number of equities, and a selected earnings per equity function. To accomplish this, the cash notional is considered as (or replaced by) a product of a notional number of equities and an earnings per equity function. The notional number of equities is a dimensionless quantity that is intended to reflect the number of equities under consideration in the transaction, and the earnings per equity function is intended to allow the parties to indicate their predictions of that quantity at maturity. The associated payoff formula may be represented as:

$$\text{Payoff} = (\text{Notional Number of Equities}) \times$$
$$(\text{Earnings per Equity Function}) \times [(\text{Strike } P/E) - (\text{Maturity } P/E)].$$

This formulation allows investors to speculate on equities that are based upon a floating P/E and a predetermined earnings per equity function, where the number of equities is also fixed. In essence, this formulation allows investors to speculate on how a P/E will affect a fixed number of equities with a predetermined earnings per equity function. Exemplary predetermined earnings per equity functions that may be employed in this formulation include, by way of non-limiting example, a current, constant, earnings per equity function (i.e., a fixed number representing the earnings per equity measured at inception), a predicted, constant, earnings per equity function (i.e., a fixed number representing a predicted earnings per equity), and an earnings per equity function whose value at a given time might depend on one or more empirically measured quantities.

Another example is an earnings per equity function whose value at maturity is an earnings per equity value of a set of one or more equities as measured at maturity. In implementing such an example, the parties select a notional number of underlying equities together with a notional earnings per equity that is allowed to float at maturity. That is, the notional includes an earnings per equity as calculated at the maturity date. The difference between the maturity P/E and the strike P/E are used to calculate a payoff using the notional number of equities and the measured floating notional earnings for the underlying equities. The payoff of this embodiment is calculated as the product of the notional number of equities, the notional earnings per unit value for the underlying equities at maturity, and the difference between the maturity P/E and the strike P/E. Accordingly, the payoff arising from such an embodiment may be calculated as:

$$\text{Payoff} = (\text{Notional Number of Equities}) \times$$
$$(\text{Notional Earnings per Equity}) \times [(\text{Maturity } P/E) - (\text{Strike } P/E)].$$

The parties settle the payoff according to the above, where the order of the above difference depends in part on which party takes the long position and which party takes the short position in the transaction.

Note that in this example, the payoff depends only on the notional number of equities, their price at maturity, a strike P/E, and an earnings at maturity. The payoff equation for this embodiment may be conceptualized as consisting of two parts. The first part, a product of a notional number of equities and the maturity price per equity, represents the cost of the set of equities at maturity. The second part, a product of the notional number of equities, their maturity earnings, and the strike P/E, represents the cost of the set of equities at maturity as calculated according to the strike P/E and the earnings at maturity. Note that the only quantity that is allowed to float in the second part of the payoff equation is the earnings per equity.

An implementation of this example may be used by a corporation that is bullish on its future earnings to lock in a P/E at its current, favorable, value in order to effectively issue stock at some future point at a price corresponding to the locked-in P/E. If the market is sluggish to react to an improved earnings report, this embodiment allows the corporation to effectively sell stock for a price that corresponds to the favorable strike P/E and improved earnings. The corporation therefore seeks to enter into the long position on its earnings in a contract with an investment bank according to embodiment of the present invention.

Elaborating, consider a corporate stock that is trading for $100 per share today, the day that earnings were reported, and has an associated earnings per share of $20. The P/E for this stock today may be calculated as: P/E=$100/$20=5. The corporation is optimistic that its earnings will increase in the next year, but fears that the market will be sluggish to react. The corporation may enter into a contract with an investment bank as follows. The parties agree at step 110 that the underlying equities will be the corporation's stock. At step 120, the parties agree that the maturity date will be in exactly one year, after the corporation reports its earnings. At step 130, the parties agree that the notional number of stock shares will be 500 and that the notional earnings per equity will be as measured at maturity. At step 140, the corporation wishes to set the strike P/E at the current P/E, namely, 5, and the investment bank agrees. At step 150, the parties agree that the maturity P/E calculation technique will be to divide the price per share on the maturity date by the annualized earnings per share reported on the maturity date.

Continuing this example, suppose that, on the maturity date, the corporation does indeed report an increased earnings-per-share of $30. The market price per share on the maturity date, however, remains unchanged at $100. The maturity price per earnings is thus: P/E=$100/$30=3.33. The strike P/E is determined to be fixed at 5.

To summarize this example:
(Notional Number of Equities)=500;
(Earnings per Equity at Maturity)=$30;
(Strike P/E)=5; and
(Maturity P/E)=3.3333.

The 500 notional shares are valued at maturity according to:

$$\text{Payoff} = (\text{Notional Number of Equities}) \times$$
$$(\text{Earnings per Equity at Maturity}) \times$$
$$[(\text{Strike } P/E) - (\text{Maturity } P/E)]$$
$$= 500 \times \$30 \times [5 - 3.3333]$$
$$= \$25,000.$$

This calculation reflects that, if the market were to price the shares according to the prior year's P/E of 5 and the newly-reported earnings per share of $30, the price per share would be $150 on the maturity date. Thus, the difference between the 500 shares at the maturity price of $100 and 500 shares at $150 is $25,000. This reflects the cost of buying 500 shares at their price on the maturity date and selling them to the investment bank for $150 each, the price that corresponds to the strike P/E and earnings per share at maturity. To conclude the transaction, the bank pays the corporation $25,000 at step 180 to settle the payoff.

Figure 2:
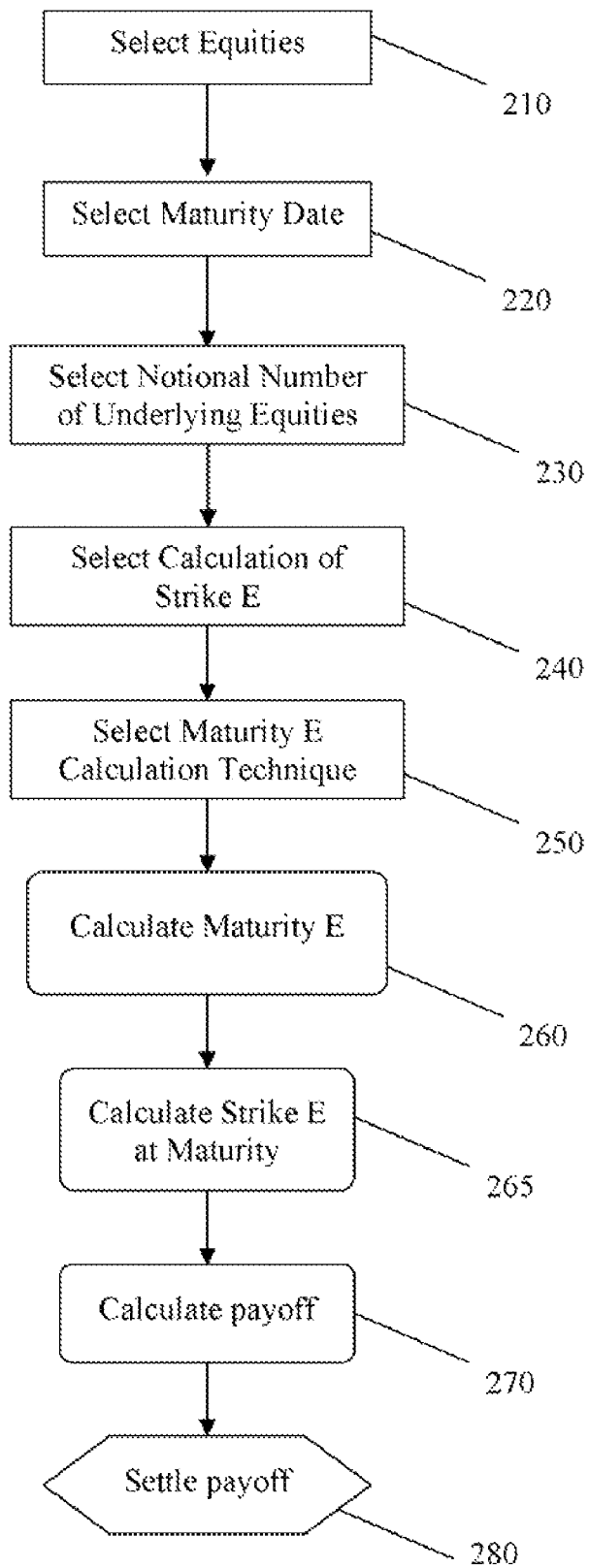
FIG. 2 is a flowchart depicting an earnings forward financial product according to an embodiment of the present invention.

FIG. 2 is a flowchart depicting an earnings forward financial product according to an embodiment of the present invention. Similar to the embodiment of FIG. 1, the parties select a set of underlying equities at step 210. At step 220, the parties select a maturity date. At step 230, the parties select a notional number of financial equities. At step 240, the parties select a calculation technique to be used to calculate the strike earnings per equity at maturity. Any function whose output is intended to be interpreted as reflecting an earnings per equity may be employed. At step 250, the maturity earnings per instrument calculation technique is selected. Any of the calculation techniques discussed herein may be used (e.g., those techniques discussed in relation to step 150 of FIG. 1). At step 260, the maturity earnings per instrument is calculated according to the technique selected at step 250. At step 265, the strike earnings per instrument is calculated according to the technique selected at step 240. The payoff is calculated at step 270. By way of non-limiting example, the payoff may be calculated according to:

$$\text{Payoff} = (\text{Notional Number of Equities}) \times$$
$$[(\text{Strike Earnings}) - (\text{Maturity Earnings})].$$

At step 280, the parties settle the payoff.

Figure 3:
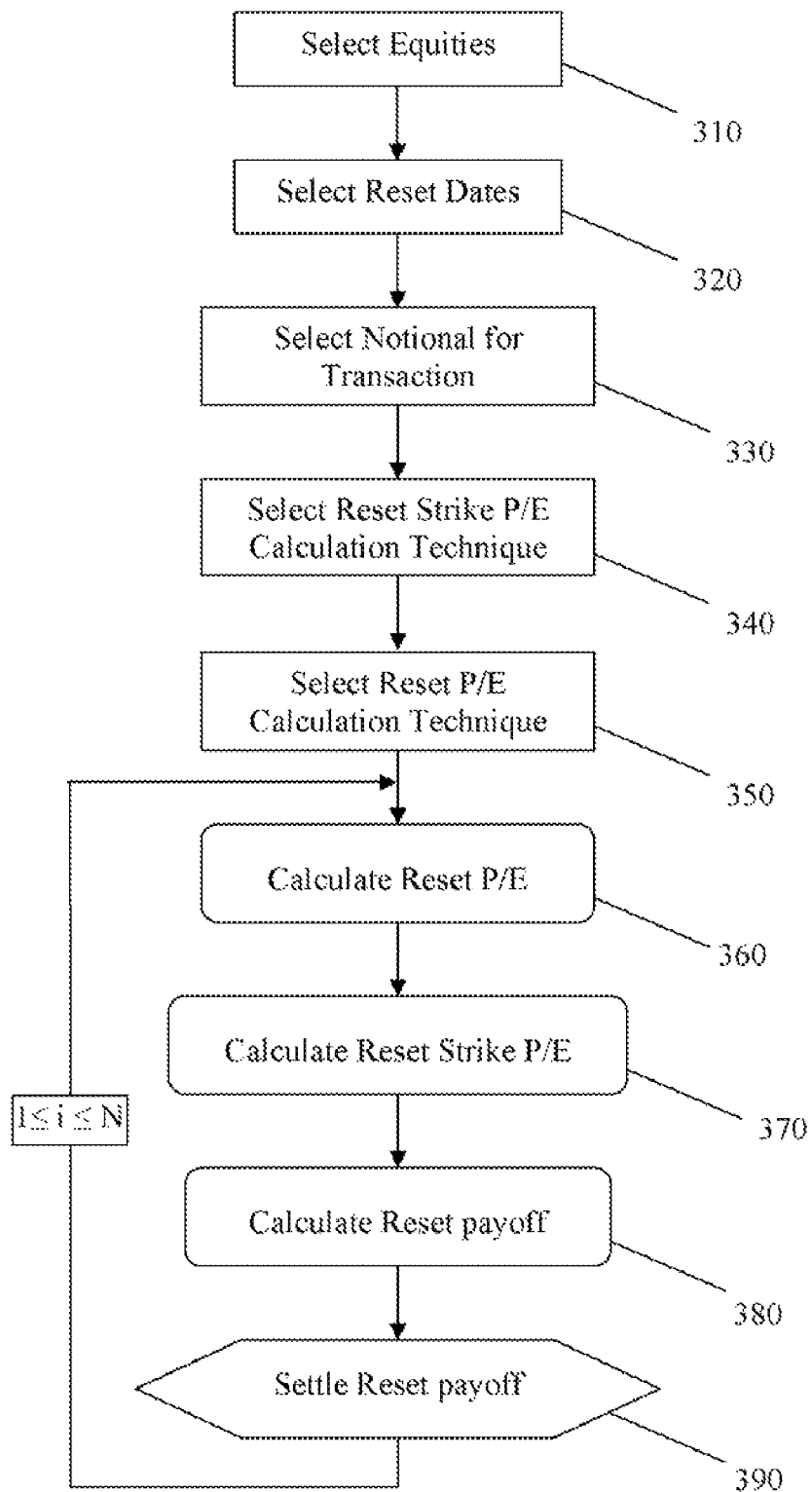
FIG. 3 is a flowchart depicting a swap according to an embodiment of the present invention.

FIG. 3 is a flowchart depicting a swap according to an embodiment of the present invention. In this embodiment, the parties exchange cash at intermediate reset dates based on reset strike P/E and a reset P/E values as calculated on those dates. Analogous to the embodiment of FIG. 1, the parties select a set containing at least one equity at step 310. The parties also select a series of reset or swap payment dates, including a final maturity date, at step 320. The reset dates may be, by way of non-limiting example, at the end of each quarter up to and including the maturity date. The parties select a notional, which may be a cash value, at step 330.

The parties select two calculation functions or algorithms: a first 340 to be used to calculate a reset strike P/E on each reset date and a second 350 to be used to calculate a reset P/E on each reset date. Note that each either or both calculation techniques may comprise simply outputting a fixed number, or, alternately, performing calculations that depend on empirical measurements of quantities up to the time of calculation. For example, the value of the reset strike P/E function on a reset date may depend on (or be identical to) the P/E of a set containing at least one equity as measured on that date. Further, the value may be constrained by a floor and/or ceiling. Similarly, the value of the reset P/E function on a reset date may depend on (or be identical to) the P/E of a set containing at least one equity as measured on that date. Again, the value may be constrained by a floor and/or ceiling.

The parties settle the swap on each reset date. At step 360, the reset P/E is calculated according to the agreed-upon reset P/E calculation technique, and at step 370 the reset strike P/E is calculated according to the agreed-upon strike P/E calculation technique. At step 380, the reset payoff is calculated, by way of non-limiting example, by multiplying the cash notional by the difference between the reset P/E and the strike P/E. That is, the reset payoff may be calculated according to:

$$\text{Payoff }(T_i) = (\text{Cash Notional}) \times [(\text{Reset } P/E \text{ at } T_i) - (\text{Reset Strike } P/E \text{ at } T_i)].$$

In the above formula, $T_i$ represents a reset date for $1 \leq i \leq N$, for a total of N reset dates. After the reset payoff is calculated, the parties settle at step 390.

Embodiments of the present invention may be combined to build more complicated financial products. As one example, a transaction may be constructed that allows for an investor to take a relative value view. Such an investor may believe that the P/E of a certain basket of stocks is high relative to the P/E of an index. The investor may enter into a short position on the P/E of the basket and a long position in the P/E of the index. By way of non-limiting example, a cash notional may be the same for both transactions. The payoff for the short position on the P/E of the basket may be represented as:

$$\text{Basket Payoff} =$$
$$(\text{Cash Notional}) \times [(\text{Basket Strike } P/E) - (\text{Basket Maturity } P/E)].$$

The payoff for the long position on the P/E of the index may be represented as:

$$\text{Index Payoff} =$$
$$(\text{Cash Notional}) \times [(\text{Index Maturity } P/E) - (\text{Index Strike } P/E)].$$

Again by way of non-limiting example, the basket strike P/E may be identical to the index strike P/E (e.g., a constant number). The net payoff of the two transaction may accordingly be represented as:

$$\text{Net Payoff} = (\text{Cash Notional}) \times$$

$$\left\{ \begin{array}{l} [(\text{Basket Strike } P/E) - (\text{Basket Maturity } P/E)] + \\ [(\text{Index Maturity } P/E) - (\text{Index Strike } P/E)] \end{array} \right\}$$

$$= (\text{Cash Notional}) \times$$

$$[(\text{Index Maturity } P/E) - (\text{Basket Maturity } P/E)].$$

Thus, the net payoff for this combined transaction depends only on two P/E functions: a maturity P/E calculation for the index and a maturity P/E calculation for the basket of stocks.

Note that in certain embodiments of the present invention, such as the combination embodiment discussed immediately above, the net payment to the investor may be negative; that is, the investor may wind up owing money. This may occur in the above embodiment if, for example, the index maturity P/E unexpectedly decreases and/or the basket maturity P/E unexpectedly increases.

Note that the embodiment of FIG. 3 may be implemented using an earnings-based derivative, such as that disclosed in relation to FIG. 2. That is, the earnings-based derivative of FIG. 2 may be implemented as a swap.

Note that embodiments of the present invention may use a set containing multiple underlying equities in order to avoid problems caused by corporate control over earnings reports. Baskets of stocks or indexes, for example, help avoid the problem of a corporation moving the market by, for example, creatively stating or re-stating earnings.

Certain embodiments of the present invention include an up-front fee from one party to another in exchange for the right to exert greater control over the strike P/E function, the maturity P/E function, or any other associated P/E function. For example, in an embodiment of FIG. 1, the bank may pay the hedge fund a fixed dollar amount as part of step 140, the selection of the (fixed, constant) strike P/E. In return, the hedge fund allows the bank greater control in the mutual selection of the strike P/E.

Certain embodiments of the present invention may include options. That is, certain embodiments may include an up-front fee in return for execution of the payoff being at the purchaser's discretion. Such an option may be structured, by way of non-limiting example, as either of the embodiments of FIGS. 1 and 2, but where the payoff occurs at one party's discretion. By way of non-limiting example, put options, call options, American options, European options, and swaptions are contemplated. In general, any option that can be structured on an equity may be employed.

Certain embodiments of the present invention may be presented to the public by an issuing entity such as an investment bank. In such cases, the investment bank will generally attempt to hedge the transaction. Such hedging may occur by the bank issuing conjugate transactions. For example, if the bank issues a first embodiment where a customer takes a long position, the bank will generally attempt to hedge the transaction by issuing a second embodiment where another customer takes the short position in a similarly-structured transaction.

Certain embodiments of the present invention have the advantage of decoupling the market's reaction to earnings reports from what its reaction should be based on an expected or historical P/E. That is, the certain embodiments allow contractual parties to receive a payout corresponding to actual earnings per equity according to the contract.

As used herein, the term "ratio function comprising a price and earnings" refers to any function that outputs at least one quantity that is meant to represent a price-to-earnings ratio or an earnings-to-price ratio. Ratio functions include time as an independent variable, but may include other independent variables. Any strike price-to-earnings ratio function or strike earnings-to-price ratio function may generally be expressed as a ratio function. Further, any maturity P/E calculation technique may be expressed as a ratio function.

Note that any embodiment of the present invention may be modified by replacing a P/E ratio parameter by an E/P ratio parameter at one or more locations. By way of non-limiting example, a P/E ratio function may be replaced by an E/P ratio function. By way of further example, such an embodiment may include a strike E/P ratio function, a maturity E/P ratio function, a notional number of equities, and a notional earnings per equity. The latter two parameters, the notional number of equities and the notional earnings per equities, may be functions. Such an embodiment may include steps analogous to those of the embodiments described above in reference to FIGS. 1 and 3, and may calculate the payoff as:

$$\text{Payoff} = (\text{Notional Number of Equities}) \times$$

$$(\text{Notional Earnings per Equity}) \times [(\text{Maturity } E/P) - (\text{Strike } E/P)].$$

Certain embodiments of the present invention may be structured in note form (e.g., as bonds). That is, an investor may purchase a note, and the associated coupon may be determined by the payoff of a contract defined according to an embodiment of the present invention.

The terminology used herein is for the purpose of describing particular embodiments only, and is not intended to limit, the scope of the present invention. Unless defined otherwise, all technical, financial and scientific terms used herein have the same meanings as commonly understood by one of ordinary skill in the art to which this invention belongs. As used throughout this disclosure, the singular forms "a," "an," and "the" include plural reference unless the context clearly dictates otherwise.

We claim:

1. A system for using an earnings to value a financial product based upon at least one equity as part of a transaction, the system comprising;
 a programmed computer processor configured m calculate a payoff using an earnings function and a quantity, in accordance with a contract, the earnings function outputting a strike earnings;
 wherein the contract specifies the earnings function and the earnings function is associated with a set comprising at least one equity, the contract further specifying the quantity associated with the set comprising at least one equity, and a transaction comprises at least part of the payoff.

2. The system of claim 1, wherein the earnings function comprises an empirically measured earnings value of a set comprising at least one equity, wherein the empirically measured earnings value is empirically measured subsequent to the selecting.

3. The system of claim 1, wherein the earnings function is a constant function, the constant function representing a strike earnings value.

4. The system of claim 1, wherein the earnings function comprises at least one of a floor and a ceiling.

5. The system of claim 1, wherein the programmed computer processor is configured to repeatedly calculate a value of at least one quantity using the earnings function in accordance with the contract, further comprising a second transaction comprising at least part of the value.

6. The system of claim 1, further comprising a swap, wherein the transaction is part of the swap.

7. The system of claim 1, wherein the quantity comprises a notional number of equities.

8. The system of claim 1, wherein the set comprising at least one equity is selected from the group consisting of: an index, a basket of stocks, and a stock.

9. The system of claim 1, wherein the financial product comprises a financial product selected from the group consisting of: a bond, a put option, a call option, an American option, a European option, and a swaption.

10. A system of using an earnings to value a financial product based upon at least one equity, as part of a transaction, the system comprising:

a processor; and a memory comprising computer-readable instructions which when executed by the processor cause the processor to perform the steps comprising:

recording an earnings function for future use, the earnings function being associated with a set comprising at least one equity, the set comprising at least one equity being associated with a quantity;

calculating a payoff using the earnings function, and the quantity, the earnings function outputting a strike earnings; and conducting a transaction, subsequent to the calculating, wherein the value comprises at least part of the transaction.

* * * * *

UNITED STATES PATENT AND TRADEMARK OFFICE
CERTIFICATE OF CORRECTION

PATENT NO. : 8,412,607 B2
APPLICATION NO. : 13/585290
DATED : April 2, 2013
INVENTOR(S) : Rama Variankaval et al.

It is certified that error appears in the above-identified patent and that said Letters Patent is hereby corrected as shown below:

In the Claims:

Column 12, line 45, claim 1, replace "m" with --to--.

Signed and Sealed this
Eighteenth Day of June, 2013

Teresa Stanek Rea
*Acting Director of the United States Patent and Trademark Office*